Patented June 22, 1926.

1,589,607

UNITED STATES PATENT OFFICE.

LEON LILIENFELD, OF VIENNA, AUSTRIA.

PROCESS OF MAKING CELLULOSE DERIVATIVES.

No Drawing. Application filed March 20, 1922, Serial No. 545,364, and in Austria April 2, 1921.

The reluctance of cellulose to react produces considerable difficulties in the manufacture of technically valuable esters and ethers of cellulose.

This difficulty has heretofore been overcome to some extent, in the manufacture of cellulose esters, by using a large excess of acylating agents, and by using relatively large quantities of the so called catalyzers (which however are known to exert a hydrolyzing action) and by using relatively long times of reaction, or by starting with hydrocelluloses.

In the manufacture of technically useful alkyl and aralkyl-ethers of cellulose, heretofore the cellulose xanthogenates, cellulose hydrates, hydrocelluloses etc., soluble in alkalies, on the one hand, and on the other hand the alkali celluloses which contain large excess of alkali have been used as the starting material. In both cases it was necessary to allow very large excesses of caustic alkali and alkylating or aralkylating agents to act on the starting material if it was desired to prepare good cellulose ethers in satisfactory yields, which were soluble without appreciable residue, and which could be worked up to produce water resistant, transparent and flexible technical products.

The lack of a starting material which made possible the esterification of cellulose with the quantities of esterifying agents not far exceeding the theoretical, at moderate temperatures and with a short time of reaction; and of a starting material which made possible the alkylation or aralkylation of cellulose to form technically useful cellulose ethers without the use of considerable excess of caustic alkalies or alkylating agents, or both, has been found technically to be a great hindrance in making cellulose derivatives, thus rendering the manufacture of cellulose derivatives highly expensive.

This disadvantage is removed by the present invention, I have now made the surprising discovery that cellulose loses its reluctance to react if it or one of its derivatives is converted by treatment with alkalies and heat in the presence of alkylating agents, into derivatives which dissolve in aqueous alkalies and which may be precipitated from such solutions by addition of acid. If these new types of cellulose derivatives in the isolated condition, or the reaction masses containing them and formed in their production, are used as starting materials for the manufacture of cellulose esters or cellulose ethers, then it is found sufficient to use quantities of esterifying agents (in esterification), or quantities of alkylating, or aralkylating agents and caustic alkalies (in alkylation or aralkylation) which practically correspond to the stoichiometric quantities or do not considerably exceed them, and it is possible to carry out the reaction at lower temperatures than heretofore, and to shorten the times of reaction. Furthermore the small volume of the mass in reaction permits an increase in the output efficiency of the apparatus. The final products; esters and alkyl or aralkyl ethers of cellulose, according to the present process, can be produced in satisfactory yields, are excellently soluble and may be worked up to techncial products (celluloid, plastic mixtures, artificial filaments, artificial films, insulating goods, finishing materials, etc.), which as regards resistance to water, flexibility, and transparency meet the requirements.

In executing the process, the cellulose is first converted into the new intermediate product, soluble in alkali, and precipitatable therefrom by acids. This may be accomplished for example by heating cellulose in any form in which it occurs, or a material containing cellulose, in the presence of alkylating agents, with such quantities of caustic alkalies as are not sufficient in themselves (i. e. without the alkylating agents) at the same temperatures and the same times of reaction, to convert the cellulose entirely into alkali-soluble conversion products. If this method be used, then products are obtained which easily dissolve in dilute alkali solutions, for example 5 to 10% caustic soda solutions, to form viscous liquids, but these products are insoluble in water alone or in the usual organic solvents. Accordingly these new bodies may be precipitated from their alkaline solutions by neutralization or acidification with acids, and they may be freed from the by-products of the reaction by washing with water.

If cellulose or a cellulose-containing material is to be used as the starting material, then in the manufacture of the new intermediate products, the necessary quantities of caustic alkali may be incorporated either by impregnating the cellulose with alkali solutions of suitable concentration, or the cellulose or the cellulose containing material may be mixed with solid caustic alkali preferably in the powdered form or with mixtures of solid caustic alkali with saturated or other solutions of alkali together containing the necessary quantity of caustic alkali, such mixing being effected by means of suitable stirring, kneading or mixing machinery.

The alkali cellulose or the cellulose containing alkali is then, preferably after a previous comminution, either immediately or after standing, heated with an alkylating or aralkylating agent, for example an alkyl or aralkyl ester of an inorganic acid. If a low boiling alkylating agent, for example if ethyl chloride or ethyl bromide or the like be used, then it is advisable to carry out the treatment in autoclaves or other pressure vessels; but if high boiling alkylating agents, for example ethyliodide or dialkyl sulfates or benzyl chloride or the like are used, the operation, may be performed in open vessels or in vessels which are provided with reflux condensers. Relatively low temperatures are sufficient to effect the conversion of the cellulose, into the intermediate product which is soluble in alkali and which can be precipitated from its alkaline solutions, by acids. In general it is found that temperatures lying between 30° and 100° C. are sufficient. The time of heating may vary considerably. In many cases the reaction is ended even in one hour. In most cases times of reaction of 2 to 12 hours are sufficient. Also it is possible to proceed by warming the cellulose or a cellulose-containing material with such quantities of caustic alkalies or caustic alkali solutions as are not in themselves sufficient to convert the cellulose into a product soluble in alkali and then heating the resulting mass with an alkylating agent. This process is obviously less advantageous than the one described above.

With regard to the quantities of caustic alkalies and alkylating agents for the making of the new initial products, it may be regarded as a rule, to which however the invention is not limited, that the quantities of caustic alkali present, calculated as caustic soda will generally amount to less than one part by weight of caustic soda to one part by weight of air-dried initial cellulose and that the quantity of the alkylating agent to be used will not amount to more than three molecules of alkylating agent to one molecular equivalent of $C_6H_{10}O_5$ calculated on the whole air dried starting material. In this calculation the whole air dried initial material, for example sulfite cellulose is to be considered as pure cellulose represented by the formula $C_6H_{10}O_5$. On the average the new intermediate products can be manufactured by means of not more than two molecules of alkylating agents per each molecular unit of $C_6H_{10}O_5$ calculated in the aforesaid manner on the whole air-dried starting material if the latter be cellulose or a cellulose-containing material, and by means of not more than one and a half molecules of alkylating agent per molecular unit of $C_6H_{10}O_5$ calculated in the aforesaid manner on the whole air-dried starting material if the latter be a cellulose derivative. As the examples show, the new type of intermediate products can be easily manufactured with considerably less quantities of caustic alkalies and alkylating agents; for instance with quantities of caustic alkali which correspond to a half molecule of caustic alkali to one unit of $C_6H_{10}O_5$ calculated in the aforesaid manner on the whole air-dried starting material (for instance sulfite cellulose) and for instance, with quantities of alkylating agents which correspond to a third to a half molecule of alkylating agent to one unit of $C_6H_{10}O_5$ calculated in the aforesaid manner on the whole air-dried starting material. In the foregoing lines are given by way of example as upper limits quantities of caustic alkalies and alkylating agents that theoretically would produce a highly or even completely alkylated cellulose for instance the hitherto known typical cellulose ethers either soluble in water or in organic solvents or both. In other words: these quantities should theoretically be sufficient to replace all hydroxylic hydrogen atoms present in the cellulose molecule by alkyl groups. The fact that the quantities above given by way of example as upper limits in the present process do not produce said cellulose ethers is accounted for by the surprising discovery that in alkylating cellulose itself or its near conversion products insoluble in alkalies, proportionately large quantities of caustic alkalies and alkylating agents or both do not act to produce such typical cellulose ethers but the here described new intermediate products, provided that appropriate amounts of water be present. It may be regarded as a rule that the new intermediate products are formed even in the presence of excessively large quantities of alkylating agents and caustic alkalies if the caustic alkali solution employed for the impregnation of the cellulose and afterwards present in the reaction mixtures is not considerably stronger than 18 to 20% and at any rate weaker than 25%. In other words: In alkylating an alkali-cellulose in which the water content is not less than about 3 times the quantity of caustic soda present, regardless of the quantities of alkylating agents and caustic alkalies introduced, the resulting product is not the hitherto known cellulose ether, but is the new intermediate product.

It is self-evident that in technical practice, unnecessary excess of reagents is to be avoided.

The new intermediate products have no similarity to the typical alkyl ethers of cellulose either those soluble in water and low in alkyl groups (for example the water soluble ethyl or methyl celluloses) or those insoluble in water but soluble in organic solvents and rich in alkyl groups, (namely, the more completely etherified alkyl or aralkyl celluloses). Many signs appear to show that the new type of intermediate products are acetal like derivatives of cellulose conversion products.

The new intermediate products, herein described are sharply distinguished from the partly alkylated cellulose ethers heretofore known and described in my prior Patent 1,188,376. Such partly alkylated ethers (especially those in which the degree of alkylation is very low) are soluble in cold water and insoluble in hot water, and are not substantially more soluble in dilute alkali solutions (at any given temperature) than in pure water, (at the same temperature).

The new intermediate products on the other hand are insoluble in both hot and cold water, but are soluble in dilute (say 10%) alkali solutions, either hot or cold. These new intermediate products are also precipitated from their alkaline solutions by neutralizing the solutions with acid or by acidifying the solutions, whether or not the said neutralization or acidification causes a heating up of the solution. These new products are also not soluble in the usual organic solvents for the partly alkylated cellulose ethers. These products, I believe, are entirely new, and are claimed as such in my copending application Ser. No. 545,365, filed concurrently herewith.

If the incorporation of the caustic alkali does not take place by impregnating the cellulosic body, employed as starting material, with a solution of caustic alkali i.e., by producing alkali-cellulose, but by mixing it with solid caustic alkali or a mixture of solid caustic alkali and a saturated solution of caustic alkali, it may be regarded as a rule that the quantities of caustic alkali present calculated as caustic soda, will generally amount to less than one part by weight of caustic soda to one part by weight of the air dried cellulosic starting material.

The alkaline solutions of the new intermediate products according to their method of production, are capable of giving either coherent water insoluble films, or crumbly friable structures when treated in thin layers with acids or other suitable precipitating baths.

Although the present invention is not limited to any process of making the new intermediate materials, but only to their properties i. e. to their containing alkyl groups and being soluble in alkali solutions but insoluble in water, it may be convenient to state that my co-pending application Serial No. 545,365 describes and claims processes of making said intermediate products, as well as the products themselves.

After the intermediate product, soluble in alkali and precipitable from its solutions by acids, has been formed, either the whole reaction mixture, (optionally after freeing it partly or wholly from water by pressing or centrifuging, or drying in air or in vacuo, or pressing and drying), is treated, with esterifying agents or alkylating agents, or aralkylating agents; or else the alkali soluble initial product is first isolated from the reaction mixture and then esterified or aralkylated or alkylated. The isolation of said intermediate product may be accomplished by simple washing out with water and optionally drying, or by treatment with an acid or an acid salt or the like, then washing out with water and optionally drying, or by dissolving in alkali, precipitating with acid and washing the precipitate with water and optionally drying.

A similar intermediate product suitable for acylation or alkylation of cellulose, may be obtained, if a cellulose derivative soluble in alkali, in which the cellulose molecule has not yet been too far broken down, for example cellulose xanthogenate (viscose) preferably in purified form, is heated in its alkaline solutions with quantities of alkylating agents which do not amount to more than one molecule and a half of alkylating agent per unit of $C_6H_{10}O_5$ calculated on the air dried starting material, in the foregoing manner. If for the manufacture of the new intermediate product, a cellulose derivative soluble in alkalies be used as a starting material, for example crude or purified viscose, then it is appropriate to operate in solution. After heating with an alkylating agent, a more or less viscous solution is obtained. This solution (either as such or after complete or partial removal of the water contained therein by evaporation in the air or in vacuo) may be treated with alkylating or esterifying agents; or from this solution by treatment with acid materials or even with water alone when very small quantities of alkylating agents, (for example ethylating agents) have been used, the new intermediate product, precipitates. It may be isolated, if desired washed with water, and dried, and then treated with esterifying or alkylating agents.

If according to the present process, alkyl ethers (for example ethyl ethers of cellulose) are made by using the new type of intermediate products, then according to the quantity of the caustic alkali and alkylating agent used in the alkylation, either low alkylated derivatives, (for example the ethyl ethers of cellulose soluble in water or swelling with water) or highly-alkylated derivatives, (for example the ethyl ethers insoluble in water and not swelling with water) are formed. If the formation of highly alkylated or aralkylated celluloses is desired then the new intermediate product is treated with such quantities of caustic alkalies and alkylating or aralkylating agents as are sufficient to cause a complete alkylation or aralkylation of the cellulose molecule, and the mixture thus obtained is heated. The caustic alkalies may be incorporated either in the form of solid caustic alkalies preferably in the powdered state, or in the form of strong solutions or in the form of strong solutions mixed with solid caustic alkalies. Also, the manufacture of the more highly alkylated or aralkylated cellulose may also be accomplished in two steps. In this case, the new intermediate product is alkylated or aralkylated first with only such quantities of caustic alkalies and alkylating or aralkylating agents as are sufficient to obtain a lower degree of etherification, (for example, a water soluble ethyl ether of cellulose) and then the reaction mass containing the product of this lower degree of alkylation, preferably after complete or partial removal of the water present in it, is treated with further quantities of caustic alkalies and alkylating or aralkylating agents, while heating.

For illustrative purposes, the following examples are given to which the invention is not restricted. The parts are by weight.

*Example I.*

200 parts of sulfite cellulose are impregnated with 1800 parts of a 9 to 18% solution of caustic soda at room temperature, and allowed to stand for 12 to 24 hours. The mass is then pressed down to 500 to 700 parts, and is comminuted either by hand or in a suitable machine, for example a shredder, edge runner, or the like. The comminuted mass (preferably after standing for 2 to 3 days at room temperature) is treated with 25 to 90 parts of ethyl chlorid, and placed under pressure preferably with stirring (for example in an autoclave provided with a stirring device, or in a rotating autoclave) and brought to 80 to 85% C., and kept at this temperature for several hours (for example 6 to 13 hours). A mass still showing structure and which feels moist results. A test sample taken from the reaction mass shows that it dissolves in dilute caustic soda solution (for example of 5 to 10%) to form a viscous solution from which the product may be precipitated by acidification. The mass is now stirred up with dilute sulfuric or hydrochloric acid in such amount as to give an acid reaction, and then freed from the mother liquor on a filtering device, is washed with water until free from acid, whereupon it is dried, after treatment if desired, with alcohol and ether. This is the new intermediate product, herein referred to, and has the properties above stated.

100 parts of the dried mass are kneaded into a mixture of 200 parts of acetic anhydride, 200 to 300 parts of glacial acetic acid, and 5 to 15 parts of concentrated sulfuric acid, with constant cooling. Even after a few minutes, solution occurs, forming a transparent, easily kneaded paste. After standing for a shorter or a longer time, preferably with constant stirring, sufficient water is added and the mass stirred, whereby acetyl cellulose is precipitated. The precipitated acetyl cellulose is collected on a filtering device, thoroughly washed with water, and dried as usual. The new intermediate product may be nitrated or formylated, etc., in an analogous manner.

*Example II.*

200 parts of sulfite cellulose are impregnated with 1800 parts of an 8 to 10% caustic soda solution at room temperature, and allowed to stand for 12 to 24 hours. The mass is then pressed to 500 parts by weight, and is comminuted either by hand or by a suitable machine, for example a shredder, edge runner or the like. The comminuted mass (if desired after 2 or 3 days standing at room temperature) is treated with 25 to 40 parts of ethyl chloride and brought to 80 to 85° C. under pressure, preferably with stirring (for example in an autoclave and kept at this temperature for several hours (for example 6 to 12 hours). A mass which still shows structure and which feels moist results. A test sample removed from the final reaction mass dissolves in dilute caustic soda solution, from which solution the body may be precipitated by the addition of an acid. The reaction mass is now incorporated with 120 to 240 parts of powdered caustic soda (or an equivalent amount of a very strong caustic soda or caustic potash solution or an equivalent mixture of a very strong caustic soda or caustic potash solution with solid caustic soda) preferably while stirring, kneading or mixing and preferably with cooling. If desired the reaction mass, before incorporation with the caustic alkali, may be neutralized with an organic or inorganic acid or an acid salt, or pressed, or centrifuged to remove excess liquor or dried by evaporation or subjected to all these three operations or to two or to one of them. According to the humidity of the air, no water, or more or less water (for example 60 to 100 parts) is absorbed by the reaction mass during the incorporation of the caustic alkali. The mass is then placed in a rotating autoclave or one provided with a stirring device and treated with 192 to 384 parts of ethyl chloride. The limits given here for the quantities of ethyl chloride correspond stoichiometrically with the above-stated limits of the quantities of caustic soda. It is recommended that the amount of ethyl chloride be calculated upon the quantity of the caustic soda employed. The reaction mixture in the autoclave is then kept for 3 to 16 hours at a temperature of 90 to 130° C., preferably with a stirring or with a shaking or other motion, of the autoclave to agitate the mass. A more or less dry-feeling mass results which optionally after a previous acidification for the purpose of removing by-products of the reaction, is well washed with water or is washed with water, then with acid and then with water again, and dried.

The dry ethyl cellulose is soluble in volatile solvents, (for example alcohol, benzol, benzol-alcohol mixture, or glacial acetic acid or chloroform or the like), and leaves a flexible skin or film behind when spread out in thin layers and dried.

Example III.

The method of operation is the same as in example II, but with the difference that for impregnating the cellulose, a 12 to 13% caustic soda solution is used instead of an 8 to 10% solution, and the mass impregnated therewith is pressed to 400 parts by weight after standing for 12 to 24 hours.

Example IV.

200 parts of sulfite cellulose are impregnated with 1800 parts of an 18% caustic soda solution at room temperature, and allowed to stand for 12 to 24 hours. The mass is then pressed to 500 to 720 parts by weight, and comminuted. The comminuted mass is then treated with 25 to 90 parts of ethyl chloride, and kept under pressure in an autoclave for a considerable time as described in the example given above, (say 3 to 16 hours) at a temperature of 70 to 110° C. The intermediate product thus obtained is then worked up further, according to examples I or II, with the production of similar products.

Of course the intermediate product produced according to the present example may also be first isolated for example by treatment with acid and thorough washing; and then esterified or etherified.

Example V.

2000 parts of the solution of a crude or purified cellulose xanthogenate, corresponding to about 160 to 170 parts of starting cellulose, (for example a solution made according to the Patent 1,379,351) is slightly warmed and to the mass there are added 50 to 100 parts of diethyl sulfate. This can be added all at once or in successive portions, while the mixture is being continuously stirred or kneaded. The heating is so conducted that the temperature of the reaction mixture rises as slowly as possible (for example 2 to 3 degrees centigrade during each 15 minutes), so that after 2 to 2½ hours the temperature has risen to 40° to 45° C. After this time the rather viscous solution is either alkylated or aralkylated further as, such or preferably after dilution with water, or after being acidified with sulfuric or hydrochloric acids, whereby a flocculent precipitate is formed which may be separated by filtration, filter-pressing etc., or decantation. This precipitate is collected on a filtering device, it may be thoroughly washed with water and if desired dried and acylated or alkylated or aralkylated according to one of the previous examples. The alkylation may either be accomplished in one or two stages, in the latter case preferably with elimination of the water after the first stage (formation of water soluble ether).

The expression "cellulosic body" in the specification as well as in the claims means: cellulose itself, conversion products insoluble in alkali and its derivatites in which the cellulose molecule is not depolymerized or only slightly depolymerized.

The expression "alkyl", "alkylation", "alkylating" are intended to cover also "aralkyl" "aralkylation" "aralkylating" the latter referring to metathetical reaction of actual alkyl groups.

The expression "ethers" "etherification" and "etherifying agents" refer to alkylation or aralkylation.

The new intermediate product, being a derivative of cellulose, soluble in alkali solutions but precipitated therefrom by neutralization with acids and the like, but insoluble in water and the common organic solvents, as also articles made therefrom, and the process of making such new intermediate products, all as above described herein, are not claimed in the present case but form the subject matter of a copending application, filed concurrently herewith, Serial No. 545,365.

I claim:

1. A process of making cellulose ethers which comprises treating a derivative of a cellulosic body which derivative contains alkyl groups and is soluble in alkali solutions but insoluble in water, with an etherifying agent, in the presence of a caustic alkali.

2. A process of making cellulose ethers which comprises treating a derivative of a cellulosic body which derivative contains alkyl groups and is soluble in alkali solutions but insoluble in water, with caustic alkali and an etherifying agent.

3. A process of making cellulose ethers which comprises treating a derivative of a cellulosic body which derivative contains alkyl groups and is soluble in alkali solutions but insoluble in water, in the presence of water, with caustic alkali and an etherifying agent.

4. A process of making cellulose ethers which comprises treating a reaction mixture containing a derivative of a cellulosic body which derivative contains alkyl groups and is soluble in alkali solutions but insoluble in water with an etherifying agent, in the presence of water and a caustic alkali.

5. A process of making cellulose ethers which comprises treating a reaction mixture containing a derivative of a cellulosic body which derivative contains alkyl groups and is soluble in alkali solutions but insoluble in water, with caustic alkali and an etherifying agent.

6. A process of making cellulose ethers which comprises treating a reaction mixture containing a derivative of a cellulosic body which derivative contains alkyl groups and is soluble in alkali solutions but insoluble in water, in the presence of water, with caustic alkali and an etherifying agent.

7. A process of making cellulose ethers which comprises treating a derivative of a cellulosic body which derivative contains alkyl groups and is soluble in alkali but insoluble in water, with solid caustic alkali and an etherifying agent.

8. A process of making cellulose ethers which comprises treating a reaction mixture containing a derivative of a cellulosic body which derivative contains alkyl groups and is soluble in alkali solutions but insoluble in water, with solid caustic alkali and an etherifying agent.

9. A process of making cellulose ethers which comprises treating a derivative of a cellulosic body which derivative contains alkyl groups and is soluble in alkali solutions but insoluble in water, with a mixture of solid caustic alkali and a saturated alkali solution and an etherifying agent.

10. A process of making cellulose ethers which comprises treating a reaction mixture containing a derivative of a cellulosic body which derivative contains alkyl groups and is soluble in alkali solutions but insoluble in water, with a mixture of solid caustic alkali and a saturated alkali solution and an etherifying agent.

11. A process of making cellulose ethers which comprises treating an alkaline solution of a derivative of a cellulosic body which derivative contains alkyl groups and is insoluble in water, with an etherifying agent.

12. A process of making cellulose ethers which comprises treating an alkaline solution of a derivative of a cellulosic body which derivative contains alkyl groups and is insoluble in water, with caustic alkali and an etherifying agent.

13. A process of making cellulose ethers which comprises treating an alkaline solution of a derivative of a cellulosic body which derivative contains alkyl groups and is insoluble in water, with solid caustic alkali and an etherifying agent.

14. A process of making cellulose ethers which comprises expelling at least part of the water contained in a reaction mixture containing a derivative of a cellulosic body which derivative contains alkyl groups and is soluble in alkali solutions but insoluble in water, and treating the residue with an etherifying agent.

15. A process of making cellulose ethers which comprises expelling at least part of the water contained in a reaction mixture resulting from the preparation of a derivative of a cellulosic body which derivative contains alkyl groups and is soluble in alkali solutions but insoluble in water, and treating the residue with caustic alkali and an etherifying agent.

16. A process of making cellulose ethers which comprises expelling at least part of the water contained in a reaction mixture containing a derivative of a cellulosic body which derivative contains alkyl groups and is soluble in alkali solutions but insoluble in water, and treating the residue with solid caustic alkali and an etherifying agent.

17. A process of making cellulose ethers which comprises adding an acid to a reaction mixture resulting from the preparation of a derivative of a cellulosic body which derivative contains alkyl groups and is soluble in alkali solutions but insoluble in water, then expelling at least part of the water present and treating the residue with caustic alkali and an etherifying agent.

18. A process of making cellulose ethers which comprises adding an acid to a reaction mixture containing a derivative of a cellulosic body which derivative contains alkyl groups and is soluble in alkali solutions but insoluble in water, then expelling at least part of the water present and treating the residue with solid caustic alkali and an etherifying agent.

19. A process of making a cellulose derivative which comprises treating a water-insoluble, alkali-soluble cellulose derivative containing an alkyl group, with a reactive agent capable of introducing an organic radical into the cellulose molecule, under reactive conditions.

20. A process of making a cellulose derivative which comprises treating a water-insoluble, alkali-soluble cellulose derivative containing an alkyl group, with a reactive agent capable of introducing an aliphatic radical into the cellulose molecule, under reactive conditions.

21. A process of making cellulose ethers which comprises treating an original reaction product containing a derivative of a cellulosic body which derivative contains alkyl groups and is soluble in alkali solutions but insoluble in water, with an etherifying agent, in the presence of water.

22. A process of making cellulose derivatives which comprises treating a derivative of a cellulosic body which derivative contains alkyl groups and is soluble in alkali solutions but insoluble in water, with a reactive agent capable of introducing an organic radical into the cellulose molecule, under reactive conditions.

23. A process of making cellulose derivatives which comprises treating a reaction mixture resulting from the preparation of a derivative of a cellulosic body which derivative contains alkyl groups and is soluble in alkali solutions but insoluble in water which reaction mixture contains such a derivative, with a reactive agent capable of introducing an organic radical into the cellulose molecule, under reactive conditions.

24. A process of making cellulose derivatives which comprises treating a reaction mixture containing a derivative of a cellulosic body which derivative contains alkyl groups and is soluble in alkali solutions but insoluble in water, with a reactive agent capable of introducing an organic radical into the cellulose molecule.

25. A process of making cellulose derivatives which comprises treating an alkaline solution of a derivative of a cellulosic body which derivative contains alkyl groups and is insoluble in water, with a reactive agent capable of introducing an organic radical into the cellulose molecule.

26. A process of making cellulose derivatives which comprises expelling at least part of the water contained in a reaction mixture containing a derivative of a cellulosic body which derivative contains alkyl groups and is soluble in alkali solutions but insoluble in water and treating the residue with a reactive agent capable of introducing an organic radical into the cellulose molecule.

27. A process of making cellulose derivatives which comprises adding an acid to a reaction mixture containing a derivative of a cellulosic body which derivative contains alkyl groups and is soluble in alkali solutions but insoluble in water, then expelling at least part of the water present and treating the residue with a reactive agent capable of introducing an organic radical into the cellulose molecule.

28. A process of making cellulose derivatives which are soluble in volatile solvents, which comprises reacting upon a cellulosic body with such quantities of alkali and alkylating agents, as to form a cellulosic compound which is insoluble in water but soluble in dilute alkali solutions, thereafter reacting upon such body with a reagent capable of effecting the substitution of an aliphatic organic radical in place of hydroxyl hydrogen.

29. A process of making cellulose esters or ethers which comprises first reacting upon a cellulosic body with such an amount of an alkali and an alkylating agent, as to form a product insoluble in water and in dilute acids, and insoluble in the usual solvents of cellulose ethers, but soluble in dilute alkali solutions, and reacting upon such product with a reagent capable of effecting the substitution of an aliphatic organic radical in place of hydroxyl hydrogen.

30. A process of making cellulose derivatives, which process comprises first heating in the presence of an alkylating agent a cellulosic body with an amount of caustic alkali in itself insufficient at the same temperature, in the same time of reaction and in the presence of the same amount of water, to convert cellulose entirely into an alkali-soluble product, to produce a product containing alkyl groups and insoluble in water but soluble in alkali solutions, and secondly treating such product with caustic alkali and an etherifying agent.

31. A process of making cellulose derivatives, which process comprises first heating in the presence of an alkylating agent, a cellulosic body with an amount of caustic alkali in itself insufficient at the same temperature, and in the same time of reaction and in the presence of the same amount of water to convert cellulose entirely into an alkali-soluble product, to produce a product containing alkyl groups and insoluble in water but soluble in alkali solutions, and secondly treating the final reaction mixture resulting from the preparation of such product and containing it, with a reagent capable of effecting the substitution of an aliphatic organic radical in place of hydroxyl hydrogen.

32. A process of making cellulose derivatives, which process comprises first heating a cellulosic body with water and an amount of caustic alkali in itself insufficient at the same temperature, in the same time of reaction, and in the presence of the same amount of water, to convert cellulose entirely into an alkali-soluble product, such operation being in the presence of an alkylating agent, to produce a product containing alkyl groups and insoluble in water but soluble in alkali solutions, and secondly treating the final reaction mixture resulting from the preparation of such product and containing it, in the presence of water, with caustic alkali and an etherifying agent.

33. A process of making cellulose derivatives, which process comprises first heating a cellulosic body in the presence of a solution of caustic alkali of less than 25% strength, with an amount of alkylating agent in the relative proportions of not more than three molecules of alkylating agent to each molecular unit of $C_6H_{10}O_5$, in such computation the entire air-dry content of the cellulosic starting material being considered as pure cellulose represented by the formula $C_6H_{10}O_5$ to produce a product containing alkyl groups and soluble in alkali solutions but insoluble in water, and secondly treating such product with a reagent capable of effecting the substitution of an aliphatic organic radical in place of hydroxyl hydrogen.

34. A process of making cellulose derivatives, which process comprises first heating a cellulosic body in the presence of a solution of caustic alkali of less than 25% strength, with an amount of alkylating agent in the relative proportions of not more than three molecules of alkylating agent to each molecular unit of $C_6H_{10}O_5$ in such computation the entire air-dry content of the cellulosic starting material being considered as pure cellulose represented by the formula $C_6H_{10}O_5$ to produce a product containing alkyl groups and soluble in alkali solutions but insoluble in water, and secondly treating such product with caustic alkali and an etherifying agent.

35. A process of making cellulose derivatives, which process comprises first heating a cellulosic body in the presence of a solution of caustic alkali of less than 25% strength, with an amount of alkylating agent in the relative proportions of not more than three molecules of alkylating agent to each molecular unit of $C_6H_{10}O_5$, in such computation the entire air-dry content of the cellulosic starting material being considered as pure cellulose represented by the formula $C_6H_{10}O_5$ to produce a product containing alkyl groups and soluble in alkali solutions but insoluble in water, and secondly treating such product in the presence of water with caustic alkali and an etherifying agent.

36. A process of making cellulose derivatives, which process comprises first heating a cellulosic body with an amount of alkylating agent in the relative proportions of less than two molecules of alkylating agent to each molecular unit of $C_6H_{10}O_5$ in such computation the entire air-dry content of the cellulosic starting material being considered as pure cellulose represented by the formula $C_6H_{10}O_5$ and in the presence of caustic alkali solution of less than 25% strength, in an amount that contains in all less than one part by weight of caustic alkali to one part by weight of the air-dried starting material, to produce a product containing alkyl groups and soluble in alkali solutions but insoluble in water, and secondly treating such product with a reagent capable of effecting the substitution of an aliphatic organic radical in place of hydroxyl hydrogen.

37. A process of making cellulose derivatives, which process comprises first heating a cellulosic body with an amount of alkylating agent in the relative proportions of less than two molecules of alkylating agent to each molecular unit of $C_6H_{10}O_5$ in such computation the entire air-dry content of the cellulosic starting material being considered as pure cellulose represented by the formula $C_6H_{10}O_5$ and in the presence of a caustic alkali solution of less than 25% strength, in an amount that contains less than one part by weight of caustic alkali to one part by weight of the air-dried starting material, to produce a product containing alkyl groups and soluble in alkali solutions but insoluble in water, and secondly treating the final reaction mixture resulting from the preparation of such product and containing it with caustic alkali and an etherifying agent.

38. A process of making cellulose derivatives, which process comprises first heating a cellulosic body with alkylating agents in the presence of caustic alkali and an amount of water not less than 3 times the quantity of caustic alkali present to produce a product containing alkyl groups and soluble in alkali solutions but insoluble in water, and secondly treating the final reaction mixture resulting from the preparation of such product and containing it with caustic alkali and an etherifying agent.

39. A process of making cellulose derivatives, which process comprises first treating cellulosic bodies with solid caustic alkali in a quantity which is less than the weight of the air-dried starting material and heating the thus obtained product with an alkylating agent to produce a product containing alkyl groups and soluble in alkali solutions but insoluble in water, and secondly treating the final reaction mixture resulting from the preparation of such product and containing it with a reagent capable of effecting the substitution of an aliphatic organic radical in place of hydroxyl hydrogen.

40. A process of producing cellulose derivatives which process comprises first heating alkali cellulose prepared by means of a solution of caustic alkali of less than 25% strength with alkylating agents and secondly treating the product thereby obtained, with an etherifying agent in the presence of caustic alkali.

41. A process of producing derivatives of cellulosic bodies which comprises the use of a cellulosic body which is capable of readily taking up approximately the stoichiometrical quantity of the organic radical of the substituting reagent used.

42. A process which comprises reacting upon a cellulosic intermediate body, containing alkyl groups, and which is soluble in alkali solutions but insoluble in water, with a material capable of introducing an aliphatic organic radical into the cellulose molecule.

43. A process which comprises reacting upon a cellulosic intermediate body which is soluble in alkali solutions but not soluble in water, with a material capable of introducing a radical into the cellulose molecule.

44. A process of making derivatives, which comprises treating a water-insoluble cellulosic product which is soluble in alkali solutions and having a reactive hydroxyl group, with a substitution reagent capable of introducing a non-aryl radical into the cellulose molecule.

45. A process of making cellulose derivatives which comprises converting a cellulosic body into a water insoluble product soluble in alkali solutions, by treatment with alkali and alkylating agent, and reacting thereupon with an agent capable of effecting the substitution of an organic radical.

46. A process of making cellulose derivatives, which process comprises first heating in the presence of an alkylating agent a cellulosic body with an amount of caustic alkali in itself insufficient at the same temperature, in the same time of reaction and in the presence of the same amount of water, to convert cellulose entirely into an alkali-soluble product, to produce a product containing alkyl groups and insoluble in water but soluble in alkali solutions, and secondly treating such product with an agent capable of effecting the substitution of an organic radical.

47. A process of making cellulose derivatives, which process comprises treating a cellulose derivative containing alkyl groups and insoluble in water but soluble in alkali solutions, with an agent capable of effecting the substitution of an organic radical.

48. A process of making cellulose derivatives, which process comprises treating a cellulosic hydroxyl-containing product containing alkyl groups and soluble in alkali solutions but not in water, with an agent capable of effecting the substitution of an organic radical for a hydroxyl group of such product.

49. A process of making cellulose derivatives which comprises the use, as starting material, of a cellulosic body which is capable of readily reacting with approximately the stoichiometrical amount of the organic radical of an agent capable of effecting the substitution of an organic radical in such cellulosic body.

50. A process of making a cellulose derivative which comprises treating a cellulosic body which is capable of readily reacting with approximately the stoichiometrical amount of the organic radical of an agent capable of effecting the substitution of an organic radical in such cellulosic body, with such an agent.

51. A process of making derivatives, which comprises converting a cellulosic body into a water insoluble product soluble in alkali solutions and having a reactive hydroxyl group, by treatment with alkali and an etherifying agent, and thereafter reacting on said hydroxyl group with an agent capable of effecting the substitution of an organic radical.

52. A process of making a cellulose derivative which comprises treating a water-insoluble, alkali-soluble cellulose derivative containing an alkyl group, with a reactive agent substantially free from sulfid but capable of introducing an organic radical into the cellulose molecule.

53. A process of making a cellulose derivative which comprises treating a water-insoluble, alkali-soluble cellulose derivative containing an alkyl group, with a reactive agent substantially free from sulfid but capable of introducing an aliphatic radical into the cellulose molecule.

54. A process of making cellulose derivatives which comprises treating a derivative of a cellulosic body which derivative contains alkyl groups and is soluble in alkali solutions but insoluble in water, with a reactive agent substantially free from sulfid but capable of introducing an organic radical into the cellulose molecule.

55. A process of making cellulose derivatives which comprises converting a cellulosic body into a water insoluble product soluble in alkali solutions and having a reactive hyrodxyl group, by treating with alkali and etherifying agent and thereafter reacting on such hydroxyl group with an agent, substantially free from sulfid but capable of effecting the substitution of an organic radical.

In testimony whereof I affix my signature.

LEON LILIENFELD.